United States Patent [19]
Foster et al.

[11] Patent Number: 5,261,180
[45] Date of Patent: Nov. 16, 1993

[54] FISH BITE SIGNAL APPARATUS

[76] Inventors: Brian Foster, 2133 SW. Morningside, Topeka, Kans. 66614; Randy W. Carrier, 5025 NW. 35th, Topeka, Kans. 66618

[21] Appl. No.: 860,006
[22] Filed: Mar. 30, 1992
[51] Int. Cl.5 .................................. A01K 97/12
[52] U.S. Cl. ............................................. 43/17
[58] Field of Search ............................ 43/17, 25

[56] References Cited

U.S. PATENT DOCUMENTS

| | | | |
|---|---|---|---|
| 2,574,333 | 11/1951 | Kuczynski et al. | 43/17 |
| 2,741,055 | 4/1956 | Weber | 43/17 |
| 2,869,275 | 1/1959 | Levin | 43/17 |
| 3,280,496 | 10/1966 | London | 43/17 |
| 3,298,126 | 1/1967 | White | 43/17 |
| 3,798,630 | 3/1974 | Crosthwait | 43/17 |
| 3,959,910 | 6/1976 | Montgomery | 43/17 |
| 4,458,437 | 7/1984 | Ou | 43/17 |
| 4,586,284 | 5/1986 | Westwood | 43/17 |

FOREIGN PATENT DOCUMENTS 565504  8/1975  Switzerland ............................ 43/17

*Primary Examiner*—Kurt C. Rowan
*Attorney, Agent, or Firm*—Thomas M. Scofield

[57] ABSTRACT

An improved fishing rod/line signalling device for attachment to a rod near the handle/reel thereof, the signalling device receiving the fishing line in such manner that an alarm, visual and/or audible will be activated when a fish strikes or takes the bait; the alarm device including a battery power source, a pair of spring biased elements adapted to receive the fishing line therewithin and permit the fishing line to be pulled out therefrom, a switch to activate or deactivate the entire circuit and a sound making device such as buzzer and a light making device such as an LED (light emitting diode) all making up the mechanism or system.

10 Claims, 1 Drawing Sheet

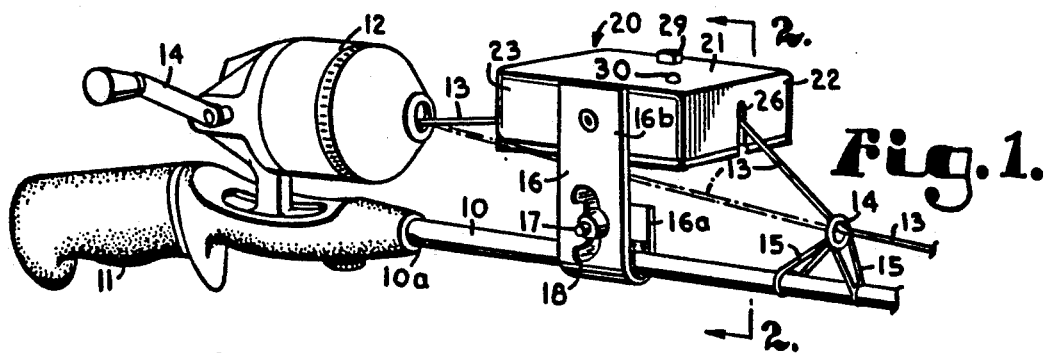

FISH BITE SIGNAL APPARATUS

BACKGROUND OF THE INVENTION

It has long been desired, in fishing circles, to have means which may be fastened to or associated with a fishing rod which will indicate clearly and unequivocally when the bait or the bait and the bait hook have been taken, seized, pulled upon or gripped in some way by a fish. The point of view here is that a fisherman/-woman does not always want to hold and monitor the fishing rod nor devote all his/her attention to the fishing act. Yet further, one fishing person may want to employ a plurality of rods and reels mounted with respect to a shoreline, a boat or other location from which fishing may be undertaken.

Accordingly, the prior art has provided and developed many types of rod carried fishing alarms which will alert the fisher with respect to activity at the bait/-hook if the activity is of sufficient energy. A number of these devices have mechanically linked the fishing line itself with an alarm or signal box where a pull on the line activates the signal in the box. Among the patents in the Prior Art section of this Application, there are seen a number of these devices.

What is desired in the subject device is a container holding a fishing line signal circuit and mechanism which may be easily installed on various types and sizes of fishing rods and adapted for use with various types of fishing line reels. The signalling device must receive and engage the fishing line in a manner that the fishing line will be pulled out of the signalling device when a fish strikes the hook or takes the bait for actuating the signalling device. The fishing line is not employed or engaged with the signalling mechanism during the throwing of the hook/bait into the water, nor is it used in recovering the fishing line from its paid out position in the water and bringing the hook/bait back to the outer end of the rod. The device with the signal, in use, may be used when trolling, still water fishing, night fishing, ice fishing, fresh water fishing or salt water fishing, enabling a person to fish with more than one rod at a time.

When it is desired to use the rod, reel, line, bait, lure, etc., in a casting and recovering operation, the line is maintained clear of and free of the engaging mechanism in the container or shell which has the alarm system in it.

Known alarm devices often have limitations in construction or in use. Many are excessively bulky, relatively complex and expensive. Others are restricted in application and relatively ineffective in use. In some, the triggering of the alarm can cause abrasion of the fishing line and deactivation of the alarm can be cumbersome.

Many anglers dislike concentrating at all times on the rod(s) and line(s) in the fishing process. They may wish to relax amid the outdoors and peaceful surroundings. Periodically, any fisherman finds it desirable to leave his line(s) not directly attended, for example, to obtain something to eat, to use sanitary facilities, to speak to another angler, etc. Under many conditions, one fisherman may be permitted to be using more than one line. When a fish presents itself, means on any fishing rod which is not closely attended are needed to call the attention of the angler to the fact that a fish has taken the bait thus to avoid loss of the fish.

This device is capable of giving warning automatically, when a load in excess of a predetermined magnitude is applied to the fishing line, indicating that a fish has taken the bait or hook. Accordingly, this is fish bite detector device for use with a fishing rod carrying a fishing line wherein a pair of of relatively movable, but spring loaded towards one another, nipper elements are provided. The device is so arranged that a part of the fishing line near the reel may be removably located between the nipper elements and releasably gripped thereby. An electrical energizing circuit is arranged to be closed in response to relative movement of the nipper elements into contact with each other upon removal of a fishing line from therebetween.

THE PRIOR ART

Applicants are aware of the below listed fishing rod bite signal devices.

Weber, U.S. Pat. No. 2,741,055, patented Apr. 10, 1956, "Fishing Signal";

Blakely, U.S. Pat. No. 3,134,187, issued May 26, 1964, for "Fishing Signal Device";

Watts, U.S. Pat. No. 3,702,513, issued Nov. 14, 1972 for "Bite Detectors For Use With Fishing Lines";

Montgomery, U.S. Pat. No. 3,959,910, issued Jun. 1, 1976 for "Fishing Signal Device";

Lemons, U.S. Pat. No. 4,384,425, issued May 24, 1983, for "Fishing Rod Bite Signal";

Newton, U.S. Pat. No. 3,820,268, issued Jun. 28, 1974, for "Bite Signal For Fishing Rod";

Roberts, U.S. Pat. No. 4,398,185, issued Aug. 9, 1983, for "Simple And Rugged Fishing Alarm";

Ou, U.S. Pat. No. 4,458,437, issued Jul. 10, 1984 for, "Signal Device For Use In Fishing";

Westwood, U.S. Pat. No. 4,586,284, issued May 6, 1986 for, "Fishing Line Signal"; and Rabino, U.S. Pat. No. 4,794,719, issued Jan. 3, 1989 for "Fishing Rod Alarm Device".

OBJECTS OF THE INVENTION

A first object of the invention is to provide a new and useful fishing signal device which operates to indicate to a fisherman, unequivocally, when a fish has taken the hook and started away with it or exerted force on it.

Another object of the invention is to provide a fishing signal device adapted to signal by both visual and audible means that a fish has been caught on the line.

Yet another object of the subject device is to provide improvements in fishing signal devices wherein the fishing line is frictionally held initially by spring loaded trigger members, such line movable or separable from the said members by a pull upon the line thereby to close the circuit of a signal producing circuit.

Still another object of the invention is to provide a novel device and system capable of giving audible and-/or visible warnings automatically when a pull or load in excess of a predetermined magnitude is applied to a fishing line, thus indicating that a fish has taken the line.

Another object of the invention is to provide a compact, light, unitary device, readily attachable to and removable from a fishing rod and the fishing line thereon, the construction being simple and fool proof, relatively inexpensive and sufficiently rugged as to be carried without particular protection in an angler's tackle box.

Another object of the invention is to provide a fishing rod bite signal including and using a visible light and audible buzzer alarm combination, such connected to a battery power source through a switch mechanism such signal having alarm actuating means frictionally engaged with the fishing line until the fish takes the bait, frees the fishing line from the actuator and triggers the alarms.

Another object of the invention is to provide a fishing rod bite signal method and apparatus which are simple in construction and operation, easy to install on a fishing rod shaft, easily associated with the fishing line to repeatedly arm the alarm and also relatively inexpensive to manufacture, while still being dependable and long lasting.

Another object of the invention is to provide a fishing line signal easily installed on various types and sizes of fishing rods and adapted, as well, for use with various types of fishing line rods and reels, the signalling device first receiving and engaging the fishing line in such a manner that the fishing line will only be pulled out of the signalling device when a fish strikes the hook or takes the bait, which action actuates the signaling device.

Other and further objects will appear in the course of the following description of the invention.

DESCRIPTION OF THE DRAWINGS

In the drawings, which form a part of the Instant Specification and are to be read in conjunction therewith, an embodiment of the invention is shown and, in the various views, like numerals are used to indicate like parts.

FIG. 1 is a ¾ perspective view, slightly from above, of the subject alarm construction removably clamped on to a fishing rod adjacent the handle end near the reel or line receptacle. (The device is shown is full lines with respect to the fishing line itself before the alarm is triggered. The triggered device is also shown in this view in dotted lines, again with respect to the fishing line itself.)

FIG. 2 is a view taken along the line 2—2 of FIG. 1 in the direction of the arrows.

FIG. 3 is a view taken along the line 3—3 of FIG. 2 in the direction of the arrows.

FIG. 4 is a view taken from below the alarm box looking upwardly thereinto in the views of FIGS. 1-3, inclusive.

FIG. 5 is a view taken along the line 5—5 of FIG. 3 in the direction of the arrows focusing on the resilient elements that removably receive the line therebetween.

FIG. 6 is a view like that of FIG. 5, but showing the spring electrical contacts after the fishing line has been withdrawn from therebetween.

FIG. 7 is a schematic electrical flow diagram of the alarm system used in the subject device.

STRUCTURE AND FUNCTION

Turning first to FIG. 1, therein is schematically shown a fishing rod 10 having a handle 11 with a fishing reel 12 removably fixable to the handle 11 or rod 10. This reel contains fishing line 13 which is released from the reel by rotating handle 14 in one direction and recovered by the reel when the handle is rotated in the other direction. At 14 there is seen a line feeding loop which is fixed to rod 10 by means 15, spacing it away from the rod 10 itself. A plurality of such loops 14 is provided the length of the real and typically, the last such loop at the end of the rod (not seen).

Between the inner end 10a of rod 10 and the first loop 14 receiving the line, there is provided the subject fish bite alarm means and system. A strap 16 having a curved lower end 16a and an upper end 16b engages rod 10 (see FIG. 2 lower left corner) by virtue of a bolt or screw member 17 engaged by a wing nut 18 operable to pull portions 16 and 16a together or towards one another at the set screw position when the wingnut 18 is turned in one direction and permit them to spring or move apart, one from the other, when wing nut 18 is rotated in the other direction on bolt 17. A semi-sleeve 19 receives a short length of the rod 10 in the lower arcuate portion 16c of member 16. Semi-sleeve 19 is plastic or a soft metal.

The casing or housing 20 (generally designated) of the line holding and signal creating mechanism and device has a top 21, slotted bottom 21a, with edges 21b defining the slot in the bottom wall, or third slot 21b, an outboard or leading wall 22, sidewalls 23 and 24 and inboard or rear wall 25. A first slot 26 and a second slot 27 are provided centrally of walls 22 and 25 in alignment with the slot 21b in the bottom wall 21a to pass line 13 therethrough. Preferably, the casing or housing 20 is substantially rectangular or six-sided inform, as shown.

Looking at FIG. 7, a schematic circuit design for the system, a battery is seen at 28. A standard off/on switch, for example, a single-pole, single-throw switch, is illustrated at 29. A light emitting diode or other light source is indicated at 30, at 31 is provided a buzzer or electrically energized noise making element. A resistor is seen at 32. Connected at one end to switch 29 is one lower leg 32a of one spring loaded arm 32b. 32b is shown in FIG. 7 as but a single leg, but is better detailed (U shaped with both feet anchored, making it a W shape (FIG. 6)) in FIGS. 5 and 6. The same is true of the other resilient spring loaded member 33a and 33b which is connected to resistor 32 and the conductor to buzzer or noise maker 31.

It may be seen that line 13 is received between the upper spring loaded nippers or members 32b and 33b, thus holding them apart from being in electrical contact. In the action of the circuit of FIG. 7, when the switch 29 is closed (open in FIGS. 5 and 7), then the battery 28 energizes the circuit except for the fact that line 13 keeps apart conducting arms 32b and 33b. Removal of line 13 from between the noted members enables them to spring together in physical and electrical contact, FIG. 6, thus energizing the LED and the buzzer. Return of the line 13 to the position of FIG. 7, even if switch 29 is closed will, stop any reaction by LED 30 or buzzer 31. Alternatively, opening switch 29 will keep the circuit inactive even if the line is not in FIG. 5.

Referring to FIGS. 5 and 6, they are fragmentary views taken along the line 5—5 of FIG. 3 in the direction of the arrows. Looking at the inside surface or underside of top wall 21 of housing 20, such is designated 21a. Looking at FIG. 4, we are now discussing the two members 32 and 33 through which line 13 passes comprising the leftmost interior elements of that view. Posts 34 and 35 are fixed to the top wall underside 21a. Foot members 32a and 33a are pierced by posts 34 and 35. Other connections 36 and 37 may be made to posts 34 and 35 to electrically contact members 32a and 33a with respect to switch 29, resistor 32, the conductors to buzzer 31, etc.

Looking at FIG. 6, each resilient line engaging member 32b, 32b' and 33b and 33b' actually comprises a U and/or W shape. Normally these elements are pressed tightly together, at least in the uppermost (FIGS. 5 and 6) portions thereof, as in FIG. 6. When line 13 is pressed upwardly between inner legs 32b' and 33b', as seen in FIG. 5, members 32 and 33 are taken out of electrical contact thereof by the line 13 physically pushing apart the inner legs 32b' and 33b'. It may be noted that there may optionally be no bottom wall to housing 20. That is, the line 13 must be able to be feed upwardly through the slots 26 and 27 and between the inner legs 32b' and 33b' of members 32 and 33 and pull downwardly and outwardly therefrom.

Looking at FIGS. 3 and 4 in view of the schematic circuit diagram of FIG. 7, battery 28 is removably received in clips 38. The line receiving and releasing spring arm members 32 and 33 are seen to the left of center in FIGS. 3 and 4 outwards from the reel handle. Switch 29 is seen only in FIG. 4 at the center bottom. Likewise, the buzzer 31 and the light emitting diode 30 are only seen in FIG. 4 at the lower right center and lower right corner.

It may be seen that the particular device here shown and described is one that is extremely simple, of a minimum number of elements, rugged because of the capacity to fix each element to the underside 21a of top wall 21 and has the parts thereof readily accessibly for replacement or repair. A case 22 inches wide, 3 inches long and 1 inch deep will easily receive all the elements of the device in commercially workable fashion.

The foregoing are typical examples of dimensions only and are not to be interpreted as limiting.

In order that the bottom of the box seen at the bottom of the device of FIG. 1 and also FIG. 3, as well as FIG. 4 wherein one looks up into the bottom of the box with any bottom plates or covers removed. Looking at FIG. 4, in the four corners thereof are seen the top ends of columns 50 and 51 on one side of slots 26 and 27 and 52 and 53 seen on the other side of the slots 26 and 27 in the front and rear walls of the box 20. These columns are molded integral with or fastened to the walls of the corners they are in and have screw receiving openings centrally of the top thereof. In this manner, two plates (not seen) may be separately fixed to the U (wide U) wall sections or wall lower ends on each side of slots 26 and 27 and line 13. The plates leave room therebetween for fitting line 13 down into the slots 26 and 27 and the engaging springs 32 and 33 for the line as seen in FIG. 5. The plates are removable for access to any of the parts in the box 20.

In this manner, the entire bottom wall (two panels) is separate from the five sided, deep cover or box having slots through the forward and rearward ends thereof.

One of the reasons this particular fish strike alarm was developed was to minimize and prevent eye strain during night fishing. With this device a fisherman in the dark may relax until one of the alarms is set off on one of his poles. It should be understood that the line 13 is not engaged by the fisherman with the members 32 and 33 of FIGS. 5 and 6 until the lure or bait has been thrown or cast to the desired position. Then the line is engaged with the spring members 32 and 33. through the slots 26 and 27. The entire assembly 16 and 20, it should be realized, can be pivoted to and fixed at any angular position desired around rod 10. That is, the pull on the line doesn't necessarily have to come from downward upwards. Thus, rotating 16 and 20 90 degrees clockwise in FIG. 1 or 90 degrees counter clockwise in FIG. 1 before locking same down on the rod will not negatively effect the function or invention. In fact, the device can be removed from the fishing pole 10 and attached (by other means than shown) to a boat oar lock, the gunwale (gunnel) of the boat or any like thing on shore. The slots 26 and 27 are merely faced toward the position the line is coming from and receive the line in the same manner as in the vertical attachment seen in FIG. 1.

The alarm is turned off manually by switch 29 when a fish strikes and is hooked. For the line gripping elements to be of a U structure as shown in the drawings, is best with a relatively soft metal such as copper. One may, however, buy beryllium copper from suppliers which is much stronger and is also a "memory" metal in that, unless there is a very, very sharp displacement of one of the arms of the line gripping members, they will return each time to a strong gripping position. In the latter case single wall spring units may serve to seize and release the line.

It should be understood that a different bottom wall slotted across its backwards to forwards (longitudinal) length and at its ends may also have integral therewith vertical (right angled) forward and rearward end walls and side walls, the forward and rearward end walls carrying slots also in line with the said slot across the different floor. Then, the circuitry elements seen in the drawings may be mounted with respect to the top wall, by means of mounting then on a circuit board, with the battery fitting down into the lower complex of end, side and bottom walls. Short legs, to be screwed onto any non-fishing rod bait or coupled with a bottom stop to fit around a fishing rod in adjustable depth fashion may be provided on one side of the elongate slot.

On left and right hand reels for fishing rods, one can merely reverse the position of the apparatus seen in FIG. 1 to adjust with respect to the user. There is no critical position for the grab means in the housing, that is, with respect to the forward or rearward slots. The buzzer and light, as is seen in FIG. 7 are placed in parallel. If one goes out, the other works. This uses less current for a longer lived battery.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments can be made of this invention without departing from the scope thereof, it is to be understood that all matter herein set forth or shown in the accompanying drawings is to be interpreted as illustrative and not in a limiting sense.

We claim:

1. A fishing bite detector for use with and carried by a fishing rod having a line storing and carrying reel associated therewith,
    a portable casing adapted to house at least a source of electrical energy and a pair of spring biased together, electricity conducting line engaging members,
    said casing substantially made of an electrically nonconducting material and being substantially six-sided, each side substantially rectangular, having top and bottom, side and end walls, each one of each of said pairs of walls positioned substantially parallel to its opposite number and having inner and outer sides thereof, one of the bottom and top walls of the casing being detachable and reattachable thereto, means for removably securing the casing to the fishing rod in front of the reel thereon, a pair of first and second, axially aligned, normally vertical slots in the front and rear walls extending upwardly from the normally lower edges of said walls, an elongate, substantially straight, third slot longitudinally present in and through the bottom wall of said casing and connecting at its front and rear ends with the lower ends of said first and second slots, the line engaging members being mounted on the inner side of the top wall and extending normally downwardly therefrom to a position close to said bottom wall slot, and a portion of the line from said reel removably engageable into said slots and between biased together portions of said line engaging members, electric warning indicator means and an electrical energizing circuit including said source of electrical energy, said warning indicating means and the biased together portions of said line engaging members energizing the warning means on movement of the line portion out from between the line engaging means.

2. A device as in claim 1 including switch control means to de-energize the electrical energizing circuit when the said device is not in use.

3. A device as claimed in claim 1 in which the warning indicator means comprises both an electrically operated audible warning device and an electrically operated luminous device.

4. A fishing bite detector for use with and carried by a fishing rod having a line storing and carrying reel associated therewith, a portable casing adapted to house at least a source of electrical energy and a pair of spring biased together, electricity conducting line engaging members, said casing substantially made of an electrically non-conducting material and being substantially six-sided, each side substantially rectangular, having top and bottom, side and end walls, each one of each of said pairs of walls positioned substantially parallel to its opposite number and having inner and outer sides thereof, one of the bottom and top walls of the casing being detachable and reattachable thereto, means for removably securing the casing to the fishing rod in front of the reel thereon, said securing means being partially fixably mounted on the outside portion of one said wall of said casing, a pair of first and second, axially aligned, normally vertical slots in the front and rear walls extending upwardly from the normally lower edges of said walls, an elongate, substantially straight, third slot longitudinally present in and through the bottom wall of said casing and connecting at its front and rear ends with the lower ends of said first and second slots, the line engaging members being mounted on the inner side of the top wall and extending normally downwardly therefrom to a position close to said bottom wall slot, and a portion of the line from said reel removably engageable into said slots and between biased together portions of said line engaging members, electric warning indicator means and an electrical energizing circuit including said source of electrically energy, said warning indicating means and the biased together portions of said line engaging members energizing the warning means on movement of the line portion out from between the line engaging means.

5. A fishing bite detector for use with and carried by a fishing rod having a fishing line storing and carrying reel associated therewith, a portable casing adapted to house at least a source of electrical energy and a pair of spring biased together, electricity conducting line engaging members, said casing substantially made of electrically non-conductive material and having an exposed lower wall provided with an axial slot therethrough adapted to receive part of a fishing line therethrough axially in line with said fishing rod, all wall portions of the casing having inner and outer faces, means for removably securing the casing to the fishing rod in front of the reel thereon, said line engaging members made of electrically conductive material received and supported within said casing, engaging portions of the line engaging members normally abutting one another closely adjacent said slot, said line engaging members resiliently biased one toward the other to make electrical contact with portions thereof near said slot, in the absence of a line between them, said line engaging member portions able and operable to clamp a length of the fishing line between the abutting portions thereof near the said slot when a part of the line is in said slot and forced between the abutting ends of the line engaging members, electrical warning indicator means an electrical energizing circuit including said source of electrical energy, said warning indicating means and said line engaging members, the source energizing the warning means on movement of the line from between the normally abutting line engaging means portions, means for removably securing the casing to the fishing rod in front of the reel thereon being partially fixably mounted on the outside portion of the bottom wall of said casing, and the slots in the end walls and bottom wall being positioned laterally of the means for attaching the casing to the fishing pole.

6. A device as in claim 5 including switch control means to de-energize the electrical energizing circuit when the aid device is not in use.

7. A device as claimed in claim 5 in which the warning indicator means comprises both an electrically operated audible warning device and an electrically operated luminous device.

8. A fishing bite detector for use with and carried by a fishing rod having a fishing line storing and carrying reel associated therewith, a portable casing adapted to house at least a source of electrical energy and a pair of spring biased together, electricity conducting line engaging members, said casing substantially made of electrically nonconductive material and having an exposed lower wall provided with an axial slot therethrough adapted to receive part of a fishing line therethrough axially in line with said fishing rod, said casing further being substantially six-sided, each side substantially rectangular, and having top and bottom, side and end walls, each one of said pairs of walls positioned substantially parallel to its opposite number and having inner and outer sides thereto, said casing further defining a pair of first and second axially aligned, normally vertical slots in the front and rear walls extending upwardly from the lower edges of said walls, and an elongate, substantially straight slot longitudinally disposed in and through the bottom wall of said casing and connecting at its front and rear ends with the lower ends of said first and second slots, means for removably securing the casing to the fishing rod in front of the reel thereon, said line engaging members made of electrically conductive material received and supported within said casing, engaging portions of the line engaging members normally abutting one another closely adjacent said slot, the line engaging members being mounted on the inner side of the top wall and extending downwardly therefrom close to said bottom wall slot, said line engaging members resiliently biased one toward the other to make electrical contact with portions thereof near said slot, in the absence of a line between them, said line engaging member portions able and operable to clamp a length of the fishing line between the abutting portions thereof near the said slot when a part of the line is in said slot and forced between the abutting ends of the line engaging members, the line from said reel being removably engageable into said slots and between normally contacting portions of said line engaging members, electrical warning indicator means and an electrical energizing circuit including said source of electrical energy, said warning indicating means and said line engaging members, the source energizing the warning means on movement of the line from between the normally abutting line engaging means portions.

9. A fishing bite detector for use with and carried by a fishing rod having a line storing and carrying reel associated therewith, a portable casing adapted to house at least a source of electrical energy and a pair of spring biased together, electrically conducting line engaging members, said casing substantially of electricity non-conducting material and being substantially six-sided, each side substantially rectangular, having top and bottom, side and end walls, each wall of each of said pairs of walls being positioned substantially parallel to its opposite number and having inner and outer sides thereof, one of the bottom and and top walls of the casing being removable and replaceable, means for removably securing the casing to the fishing rod in front of the reel thereon, a pair of first and second, axially aligned, normally vertical slots in the front and rear walls extending upwardly from the lower edges of said walls, an elongate, substantially straight third slot longitudinally received through the bottom wall of said casing and connecting at its front and rear ends with the lower ends of said first and second slots at substantial right angles thereto, the line engaging members being mounted on the inner side of the top wall and extending downwardly therefrom close to said bottom wall slot, the line from said reel removably engageable into said slots and between the lower ends of said line engaging members, electric warning indicator means and an electrical energizing circuit, including said source of electrical energy, said warning indicating means and said biased together portions of line engaging members energizing the warning means on movement of the line from between line engaging means.

10. A device as in claim 11 wherein said casing securing means is removably connected to one of said casing side walls.

* * * * *